Patented June 12, 1951

2,557,052

UNITED STATES PATENT OFFICE 2,557,052

PROGESTERONE SUSPENSIONS

Robert E. Himelick, Kalamazoo, Mich., assignor to The Upjohn Company, Kalamazoo, Mich., a corporation of Michigan No Drawing. Application October 24, 1947, Serial No. 782,017

8 Claims. (Cl. 167—74)

This invention relates to aqueous suspensions of progesterone, made possible by employment of a specific type of suspending agent.

An aqueous suspension of the water-insoluble hormone, progesterone, is a desirable dosage form for its administration by hypodermic injection, other than intravenously. When an aqueous suspension is injected, the solvent rapidly diffuses into the body fluids leaving a deposit of the previously suspended particles. These particles, having but a limited solubility in the body, dissolve slowly, which leads to a prolonged duration of activity following a single injection.

In order that an aqueous suspension be suitable for use, it is necessary that the insoluble ingredients be uniformly distributed throughout the water at the time of administration. This is particularly true when a multiple dose ampoule is used, although in any case it is necessary that none of the suspension be permitted to adhere to the container. If material does adhere to the container, thus not being in suspension, it is not withdrawn and the administered dose is obviously then less than that calculated from the stated contents of the ampoule and the volume injected.

It is not possible to prepare a suitable suspension of progesterone in distilled water. Microcrystals of progesterone, which are a preferred size for the preparation of suspensions, are hydrophobic, being wet by water with extreme slowness. After once being wet, however, it is not possible by mechanical treatment to prepare a suitable suspension, a part of the progesterone always remaining as a froth on the top of the water. That which does not settle beneath the surface is in the form of a flocculent precipitate and such mixture in no way approaches a suspension suitable for hypodermic injection.

It is, therefore, an object of this invention to prepare an aqueous suspension of progesterone which is not subject to lumping and which may be readily re-established even after longstanding. It is a further object of this invention to provide a suspension of progesterone with necessary accessory substances, which alone have been found to allow establishment of the suspension. Other objects will become apparent from the following specification and claims.

I have found that an aqueous suspension of progesterone may be prepared by the addition of a suitable wetting agent to the aqueous solution in which the progesterone is to be suspended. Cationic, anionic, and neutral wetting agents may be used for such purpose, non-toxicity permitting.

Excellent wetting agents meeting the necessary requirements are the fatty acid esters of water-soluble polyhydric aliphatic alcohols or derivatives modified by reaction with a plurality of alkylene oxide groups. Such agents are water-soluble and also excellent solvents for lipoid-soluble substances. These products comprise a series of polyalkylene oxide derivatives of partially esterified polyhydric alcohols or their anhydrides. The esters and polyoxyalkylene derivatives that may be used are described in the patent literature, as wetting, cleansing and dispersing agents in the textile and allied industries.

Among the wetting agents which are particularly suitable for the present purpose are the polyethylene oxide derivatives of sorbitan monolaurate, monopalmitate, monostearate, monooleate, the complex of monostearate of propylene glycol with ethylene oxide, and the like complex of the monooleate of ethylene glycol with propylene oxide. These derivatives are considered as partial esters of polyhydric alcohols with fatty acids in which the acid radical or radicals are joined to a carbon atom or carbon atoms of the polyhydric alcohol and one or more of the remaining alcohol groups are reacted with alkylene oxide molecules, suitably 16 or more mols of alkylene oxide per mol of partial ester. The acid which is esterified with the polyhydric alcohol is a long-chain fatty acid containing not less than 12 carbon atoms to the molecule, as, for example, lauric, stearic, palmitic or oleic acid. For best results the number of alkylene oxide groups should be about 16 to 25.

All these compounds may be made by methods that are usual in making such alkylene oxide complexes, the monoester selected and also the alkylene oxide used being those desired in the finished product.

A typical example of one of these derivatives is sorbitan monolaurate modified by the introduction of 20 ethylene oxide molecules to the molecule of the final complex compound.

Sorbitan, being the anhydride of sorbitol, is readily soluble in water. The monolauric acid ester of sorbitan is soluble in ethyl alcohol and other fat solvents but, on the other hand, only dispersible in water. It has lipophilic and fair hydrophilic properties. This ester will react with ethylene oxide under known conditions, so that the free hydroxyl groups of the sorbitan are modified, to give any addition product having a plurality of ethylene oxide groups. For convenience, these ethylene oxide addition products are sometimes referred to as "ethylene oxide complexes."

The introduction of the ethylene oxide increases the hydrophilic properties of the product without greatly affecting its lipophilic properties.

A suspension prepared by employment of a wetting agent is uniform and suitable for immediate use. However, upon prolonged standing, e. g., for a week or a month or longer, as is usual with a product in the channels of commerce, the suspension settles with formation of a hard, compact, and somewhat adherent cake upon the bottom of the container. This cake may sometimes be broken up and re-suspended by severely shaking the container by hand, but extreme care must be taken that all of the material is loosened from the container and that no large clumps remain. It is possible by such vigorous and prolonged manual shaking, and the exercise of due care, to re-suspend the progesterone in the solution so that it is suitable in all respects for hypodermic injection, but the suspension is re-established only with considerable difficulty and inconvenience.

However, if in addition to the wetting agent, certain accessory substances are incorporated into the suspension, preferably during its preparation, they will prevent the formation of the hard, compact adherent cake to which reference has been made. In addition to the prevention of the cake, these substances greatly influence the rate and amount of settling of the suspension. In the composition of the present invention, the height of clear liquid above the suspension is usually only about one-fourth to one-third of the total liquid height. In all cases, however, a soft, loose, non-adherent layer is formed, which, upon gentle shaking or several inversions of the ampoule, gives a suspension equal in usefulness to a freshly prepared suspension. This permits withdrawal from the container of a uniform suspension containing a calculable quantity of solid per unit of volume. This is of particular advantage when a multiple dose vial is used.

Among the substances which are suitable for use as accessory substances with the wetting agent in the preparation of a progesterone suspension having the desirable properties previously described are esters of cholic acid, mixed estrogenic substances, estrone, a mixture of sterols such as are obtained from soy beans, and mixtures of the foregoing. Of these substances, a preferred embodiment of the invention contemplates the use of alkyl esters of cholic acid such as the methyl and butyl ester of cholic acid. It is to be noted that all of these substances have in common the cyclopentanoperhydrophenanthrene nucleus, which is characteristic of that group of compounds known as steroids, but all compounds with a steroid nucleus are not effective accessory substances.

The mixed estrogenic substances which are of value in the practice of this invention may be obtained from mares' urine by a process such as described by Butenandt, Zeitschr. f. physiol. chem. 191, 127 (1930). The mixed estrogens, obtained by the cited and similar methods, consist of a large proportion of estrone and smaller quantities of equilin, equilenine, hippuleine and estradiol. A mixture of these substances is somewhat more effective than estrone alone. However, pure estrone, when incorporated into the suspension, will give the desired soft, loose, easily re-suspended layer.

The mixed soy sterols are obtained by the saponification of the "foots" remaining after commercial processing of soy bean oil, using procedures such as those of Steiger and Reichstein, Helv. Chim. Acta 20, 1043, (1937) or Kraybill, Thornton and Eldridge, Ind. Eng. Chem. 32, 1138, (1940). Such mixed soy sterols are composed chiefly of sitosterol along with stigmasterol or stigmasterol acetate.

The suspension of this invention has been described using, as the fluid, pure distilled water. For the purpose of human administration, it is the custom of those skilled in the art to use physiological salt solution in place of distilled water. It is therefore to be understood, within the scope of this invention, that water and a physiological salt solution are equivalent, the latter being only a preferred form of the invention.

The following examples are illustrative of the practice of the present invention, but are not to be considered as limiting.

(A) One formulation suitable for progesterone suspension is as follows:

| | | |
|---|---|---|
| Progesterone (micro-crystals) | grams | 2.0 |
| Methyl cholate (micro-crystals) | gram | 0.1 |
| A polyoxyalkylenesorbitan monolaurate | gram | 0.1 |
| Physiological salt solution q. s. | cc | 100.0 |

The micro-crystalline progesterone and methyl cholate are mixed in the dry state, after which they are rubbed to a smooth paste with a small portion of the physiological salt solution containing a polyoxyalkylenesorbitan monolaurate. The mixture is gradually diluted to 100 cubic centimeters with the salt-wetting agent solution. This suspension is passed through a homogenizer, after which it is heated to about 70 degrees centigrade, and the solution thereafter cooled with vigorous agitation.

A magma-like suspension results which settles only partially on long standing, and may be resuspended uniformly by gentle manual shaking.

(B) In another practice of my invention, the following ingredients may be used:

| | | |
|---|---|---|
| Progesterone (micro-crystals) | grams | 2.0 |
| Mixed estrogens (micro-crystals) | gram | 0.1 |
| A polyoxyalkylenesorbitan monolaurate | gram | 0.1 |
| Physiological salt solution q. s. | cc | 100.0 |

After mixing together in the dry state, the micro-crystals of progesterone and mixed estrogens are rubbed to a smooth paste with a portion of the salt solution in which the polyoxyalkylenesorbitan monolaurate has been dissolved. The suspension is homogenized, heated to about 70 degrees centigrade, and then cooled while agitating vigorously.

When this formula is used a suspension is produced that settles to only a slightly greater extent than the one previously described, forming a soft, loose layer which is easily re-suspended by gentle manual shaking of the container, even after standing undisturbed for several months.

(C) In another practice of my invention, the following ingredients may be used:

| | | |
|---|---|---|
| Mixed estrogens (micro-crystals) | grams | about 2.0 |
| Progesterone (micro-crystals) | gram | about 0.1 |
| Methyl cholate (micro-crystals) | gram | about 0.1 |
| A polyoxyalkylenesorbitan monolaurate | gram | about 0.2 |
| Physiological salt solution q. s. | cc | about 100.0 |

After mixing together in the dry state, the micro-crystals of progesterone, mixed estrogens, and methyl cholate are rubbed to a smooth paste with a portion of the salt solution in which polyoxyalkylene sorbitan monolaurate has been dissolved. The suspension is homogenized, heated to about 70 degrees centigrade, and then cooled while agitating vigorously.

(D) Another suitable suspension comprises the following:

Mixed estrogens (micro-crystals) grams__ about 8.0
Progesterone (micro-crystals) __gram__ about 0.8
A polyoxyalkylenesorbitan monolaurate, gram__ about 0.2
Physiological salt solution q. s_____cc___ 100.0

While the above formulas represent desirable concentrations for therapeutic use, these concentrations may be varied considerably, but preferably within the following limits:

mg. per cc.
Progesterone _____ 20 to 80
Accessory substance or Stabilizing agent _____ 0.5 to 8.0
Wetting agent _____ 0.1 to 2.0

Various modifications may be made in the present invention, which is limited only as defined by the appended claims.

I claim:

1. As an article of manufacture, a stabilized aqueous suspension of progesterone comprising, per cubic centimeter of suspension, 20 to 80 milligrams of progesterone, 0.5 to 8.0 milligrams of a suspension stabilizer, 0.1 to 2.0 milligrams of a water-soluble polyalkylene oxide derivative of a partial long-chain fatty acid ester of a compound of the group consisting of polyhydric alcohols and their anhydrides, wherein the suspension stabilizer is a steroid of the group consisting of alkyl esters of cholic acid, mixed estrogenic substances, estrone, and mixed soy bean sterols.

2. As an article of manufacture, a stabilized aqueous suspension of progesterone comprising, per cubic centimeter of suspension, 20 to 80 milligrams of progesterone, 0.5 to 8.0 milligrams of a suspension stabilizer, 0.1 to 2.0 milligrams of a partial long-chain fatty acid ester of a polyoxyalkylenesorbitan, wherein the suspension stabilizer is a steroid of the group consisting of alkyl esters of cholic acid, mixed estrogenic substances, estrone, and mixed soy bean sterols.

3. As an article of manufacture, a stabilized aqueous suspension of progesterone comprising:

Progesterone _____grams__ about 2.0
Methyl cholate_____gram__ about 0.1
A polyoxyalkylenesorbitan monolaurate _____gram__ about 0.1
Physiological salt solution q. s_____cc___ 100.0

4. As an article of manufacture, a stabilized aqueous suspension of progesterone comprising:

Progesterone _____grams__ about 2.0
Estrone _____gram__ about 0.1
A polyoxyalkylenesorbitan monolaurate _____gram__ about 0.1
Physiological salt solution q. s_____cc___ 100.0

5. As an article of manufacture, a stabilized aqueous suspension of progesterone comprising:

Progesterone _____grams__ about 2.0
Mixed estrogens_____gram__ about 0.1
Methyl cholate_____gram__ about 0.1
A polyoxyalkylenesorbitan monolaurate _____gram__ about 0.1
Physiological salt solution q. s_____cc___ 100.0

6. A method for the preparation of a stabilized aqueous suspension of progesterone crystals comprising mixing progesterone, a water-soluble polyalkylene oxide derivative of a partial long-chain fatty acid ester of a compound of the group consisting of polyhydric alcohols and their anhydrides, water, and a suspension stabilizing agent of the group consisting of alkyl esters of cholic acid, mixed estrogenic substances, estrone, and mixed soy bean sterols; heating to about 70 degrees centigrade, and cooling the fluid mixture with agitation.

7. A stabilized aqueous progesterone suspension comprising progesterone, a wetting agent consisting essentially of a water-soluble reaction product of at least 16 molecules of ethylene oxide and one molecule of sorbitan monolaurate, and a lower alkyl ester of cholic acid, in amounts per cubic centimeter of suspension within the ranges of approximately 20 to approximately 80 milligrams for progesterone, approximately 0.1 to approximately 2.0 milligrams for the wetting agent, and approximately 0.5 to approximately 8.0 milligrams for the cholic acid ester.

8. A stabilized aqueous suspension of progesterone crystals comprising:

Progesterone _____grams__ approximately 8.0
Mixed estrogens_____gram__ approximately 0.8
A polyoxyalkylenesorbitan monolaurate _____gram__ approximately 0.2
Physiological salt solution q. s_____cc__ 100.0

ROBERT E. HIMELICK.

REFERENCES CITED

The following references are of record in the file of this patent:

UNITED STATES PATENTS

| Number | Name | Date |
| --- | --- | --- |
| 2,394,628 | Meyer | Feb. 12, 1946 |
| 2,417,299 | Freedman | Mar. 11, 1947 |

FOREIGN PATENTS

| Number | Country | Date |
| --- | --- | --- |
| 515,671 | Great Britain | publ. 1940 |

OTHER REFERENCES

Hanzlik in Endocrinology, pp 368–374, March, 1941, page 372 relied on.

Mitchell "A textbook of Biochemistry" 1st Ed. 1946, pp 239, 240.

Atlas—"Spans and Tweens" page 7 relied on, November, 1942.

Koref in Endocrinology, vol. 38, March, 1946, pp. 214, 215.

Lyons et al. in Proc. Soc. Exptl. Biol. & Med., October, 1941, vol. 48 pages 83–89.

Robson "Recent Advances in Sex & Reproductive Physiology," 1940.

Grollman "Essentials of Endocrinology" 2nd Ed. 1947, pages 539, 544.